(12) United States Patent
Gregorius et al.

(10) Patent No.: US 7,446,072 B2
(45) Date of Patent: Nov. 4, 2008

(54) PREPARATION OF SUPPORTED CATALYST SYSTEMS CONTAINING REDUCED AMOUNTS OF ALUMINOXANES

(75) Inventors: Heike Gregorius, Koblenz (DE); Volker Fraaije, Frankfurt (DE); Manfred Lutringshauser, Frankenthal (DE)

(73) Assignee: Basell Polyolefine GmbH, Wesseling (DE)

(*) Notice: Subject to any disclaimer, the term of this patent is extended or adjusted under 35 U.S.C. 154(b) by 0 days.

(21) Appl. No.: 10/539,881

(22) PCT Filed: Dec. 16, 2003

(86) PCT No.: PCT/EP03/14265

§ 371 (c)(1),
(2), (4) Date: Jun. 16, 2005

(87) PCT Pub. No.: WO2004/055070

PCT Pub. Date: Jul. 1, 2004

(65) Prior Publication Data

US 2006/0058180 A1     Mar. 16, 2006

Related U.S. Application Data

(60) Provisional application No. 60/441,382, filed on Jan. 21, 2003.

(30) Foreign Application Priority Data

Dec. 16, 2002  (DE)  ................................. 102 58 968

(51) Int. Cl.
- C08F 4/02     (2006.01)
- C08F 4/642    (2006.01)
- C08F 4/6592   (2006.01)

(52) U.S. Cl. .................... 502/152; 502/104; 502/120; 502/132; 502/155; 526/161; 526/165

(58) Field of Classification Search ................ 526/165, 526/161; 502/104, 120, 132, 152, 155
See application file for complete search history.

(56) References Cited

U.S. PATENT DOCUMENTS

| | | | |
|---|---|---|---|
| 5,840,645 A | | 11/1998 | Ohno et al. |
| 5,968,864 A | * | 10/1999 | Shamshoum et al. ........ 502/104 |
| 5,985,784 A | | 11/1999 | Winter et al. |
| 6,124,230 A | | 9/2000 | Speca et al. |
| 6,265,339 B1 | | 7/2001 | Bidell et al. |
| 6,339,128 B1 | * | 1/2002 | Nakayama et al. .......... 525/191 |
| 6,562,918 B1 | | 5/2003 | Minami et al. |
| 6,576,723 B1 | | 6/2003 | Bohnen et al. |
| 6,589,905 B1 | | 7/2003 | Fischer et al. |
| 2003/0130443 A1 | * | 7/2003 | Suhm et al. ................... 526/65 |
| 2003/0149199 A1 | | 8/2003 | Schottek et al. |
| 2006/0063666 A1 | | 3/2006 | Rohde et al. |

FOREIGN PATENT DOCUMENTS

| | | | |
|---|---|---|---|
| EP | 0 287 666 | | 10/1988 |
| EP | 0 294 942 | | 12/1988 |
| EP | 0 442 725 | | 8/1991 |
| EP | 0 553 757 | | 8/1993 |
| EP | 0 582 480 | | 2/1994 |
| EP | 0 704 461 | | 4/1996 |
| EP | 1 085 025 | | 3/2001 |
| JP | 10-212308 | | 8/1998 |
| JP | 11-240912 | | 9/1999 |
| WO | WO-96/11961 | | 4/1996 |
| WO | WO-97/11775 | | 4/1997 |
| WO | WO-98/01481 | | 1/1998 |
| WO | WO-99/61487 | | 12/1999 |
| WO | WO-00/05277 | | 2/2000 |
| WO | WO-00/31090 | | 6/2000 |
| WO | WO 01/46274 | * | 6/2001 |
| WO | WO-01848034 | | 7/2001 |
| WO | WO-03/045964 | | 6/2003 |
| WO | WO 2004/052948 | | 6/2004 |

OTHER PUBLICATIONS

Kleinschmidt, Y, et al., "Kinetics and Mechanistic Insight Into Propylene Polymerization with Different Metallocenes and Various Aluminum Alkyls as Cocatalysts", Journal of Molecular Catalysis A: Chemical 148 (1999), pp. 29-41.

* cited by examiner

Primary Examiner—Caixia Lu
(74) Attorney, Agent, or Firm—Jarrod N. Raphael

(57) ABSTRACT

The present invention relates to a process for preparing a catalyst solid for olefin polymerization, comprising a finely divided support, an aluminoxane and a metallocene compound, which comprises a) firstly combining the finely divided support with the aluminoxane and subsequently b) adding the reaction product of a metallocene compound with at least one organometallic compound to the modified support, catalyst solids obtainable by this process, catalyst systems comprising these catalyst solids, their use for the polymerization of olefins and a process for the polymerization of olefins.

29 Claims, No Drawings

PREPARATION OF SUPPORTED CATALYST SYSTEMS CONTAINING REDUCED AMOUNTS OF ALUMINOXANES

RELATED APPLICATIONS

This application is a national stage application (under 35 U.S.C. 371) of PCT/EP2003/014265 filed Dec. 16, 2003 which claims benefit to German application 102 58 968.2 filed Dec. 16, 2002 and U.S. provisional application 60/441,382 filed Jan. 21, 2003.

The present invention relates to a process for preparing a catalyst solid for olefin polymerization, comprising a finely divided support, an aluminoxane and the reaction product of a metallocene compound and an organometallic compound, catalyst solids obtainable by this process, catalyst systems comprising these catalyst solids, their use for the polymerization of olefins and a process for the polymerization of olefins.

Organometallic transition metal compounds such as metallocene complexes are of great interest as catalysts for olefin polymerization because they make it possible to synthesize polyolefins which are not obtainable by means of conventional Ziegler-Natta catalysts. For example, such single site catalysts lead to polymers having a narrow molar mass distribution and a uniform incorporation of comonomers. For these to be able to be used successfully in polymerization processes in the gas phase or in suspension, it is often advantageous for the metallocenes to be used in the form of a solid, i.e. for them to be applied to a solid support. Furthermore, the supported catalysts should have a high productivity and lead to polymers having a good morphology.

For metallocene complexes to be active as catalysts for olefin polymerization, it is necessary for them to be reacted with further compounds serving as cocatalysts. A frequently used class of cocatalysts comprises aluminoxanes such as methylaluminoxane (MAO). However, these have the disadvantage that they have to be used in a large excess and are also expensive. Efforts have therefore been made for some time to replace aluminoxanes at least partly by less expensive compounds without significant adverse effects on productivity and morphology and on the polymer properties having to be accepted.

EP-A 287 666 describes catalysts comprising metallocene compounds for olefin polymerization which display good polymerization activities when reduced amounts of aluminoxanes are present. The catalysts are composed of a metallocene compound, an inorganic support, an aluminoxane and an organoaluminum compound containing hydrocarbon groups which are not n-alkyl groups. In the preparation of the catalyst solid, the support is firstly brought into contact with the aluminoxane after which the metallocene is added. The organoaluminum compound is added only during the polymerization.

EP-A 294 942 discloses prepolymerized catalysts comprising metallocene compounds which contain reduced amounts of aluminoxanes, display good polymerization activities and produce polymers having a good morphology. The catalysts are prepared from an organometallic compound, a finely divided support, an aluminoxane and a metallocene. To prepare the catalysts, the support is firstly combined with the organometallic compound and the aluminoxane after which the metallocene is added.

EP-A 442 725 describes catalyst solids which are obtained by an aluminoxane firstly being produced by reaction of water with an organoaluminum compound on a particulate support, subsequently bringing the reaction product into contact with a further organoaluminum compound and then with a metallocene compound and then carrying out a prepolymerization using this composition.

EP-A 553 757 teaches that the required amount of aluminoxane can be reduced in catalyst systems for olefin polymerization comprising metallocene compounds with an acceptable reduction in activity when the catalyst system comprises an organoaluminum compound as further cocatalyst. Supported catalyst systems can be obtained by applying the cocatalyst which is brought into contact with the metallocene prior to the polymerization reaction to a support and then adding a solution of the metallocene to the supported cocatalyst.

EP-A 704 461 discloses prepolymerized catalysts which are obtained using bisindenylmetallocenes. They are prepared by firstly reacting a finely divided support with an aluminoxane and subsequently adding a bisindenylmetallocene compound. A prepolymerization is subsequently carried out in the presence of an organoaluminum compound.

WO 97/11775 describes supported catalyst systems in the case of which a support is firstly treated with an organometallic compound and the passivated support obtained in this way is then brought into contact with the reaction product of a metallocene and an aluminoxane.

However, the catalyst systems known from the prior art have the disadvantages that the reduction in the amount of aluminoxane used or its partial replacement by organometallic compounds leads to not inconsiderable adverse effects on the productivity and the morphology of the polymers formed or the preparation of the catalyst systems is complicated since a prepolymerization of the catalyst solids and a series of washing steps are necessary.

It is an object of the present invention to remedy the disadvantages mentioned and to find catalyst systems which, despite a considerably reduced aluminoxane content, display a very good productivity, lead to polymers having a good morphology and form no deposits in the polymerization reactors during the polymerization, and require no complicated process steps such as prepolymerization or multiple washing steps for their preparation.

We have found that this object is achieved by a process for preparing a catalyst solid for olefin polymerization, comprising a finely divided support, an aluminoxane and a metallocene compound, which comprises
a) firstly combining the finely divided support with the aluminoxane and subsequently
b) adding the reaction product of a metallocene compound of the formula (I),

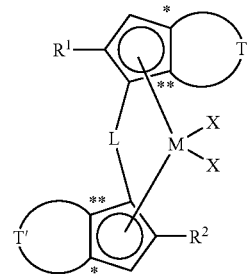

(I)

where
M is zirconium, hafnium or titanium,
X are identical or different and are each, independently of one another, hydrogen or halogen or a group —R, —OR, —OSO$_2$CF$_3$, —OCOR, —SR, —NR$_2$ or —PR$_2$, where R is linear or branched C$_1$-C$_{20}$-alkyl, C$_3$-C$_{20}$-cycloalkyl which may bear one or more C$_1$-C$_{10}$-alkyl radicals as substituents, C$_6$-C$_{20}$-aryl, C$_7$-C$_{20}$-alkylaryl or C$_7$-C$_{20}$-arylalkyl and may contain one or more heteroatoms from groups 13-17 of the Periodic Table of the Elements or one or more unsaturated bonds, with the two radicals X also being able to be joined to one another, L is a divalent bridging group selected from the group consisting of $C_1$-$C_{20}$-alkylidene, $C_3$-$C_{20}$-cycloalkylidene, $C_6$-$C_{20}$-arylidene, $C_7$-$C_{20}$-alkylarylidene and $C_7$-$C_{20}$-arylalkylidene radicals which may contain heteroatoms from groups 13-17 of the Periodic Table of the Elements or is a silylidene group having up to 5 silicon atoms, $R^1$ and $R^2$ are identical or different and are each, independently of one another, hydrogen or linear or branched $C_1$-$C_{20}$-alkyl or $C_3$-$C_{20}$-cycloalkyl which may bear one or more $C_1$-$C_{10}$-alkyl radicals as substituents, $C_6$-$C_{20}$-aryl, $C_7$-$C_{40}$-alkylaryl or $C_7$-$C_{40}$-arylalkyl and may contain one or more heteroatoms from groups 13-17 of the Periodic Table of the Elements or one or more unsaturated bonds, T and T' are divalent groups of the formulae (II), (III), (IV), (V), (VI) or (VII),

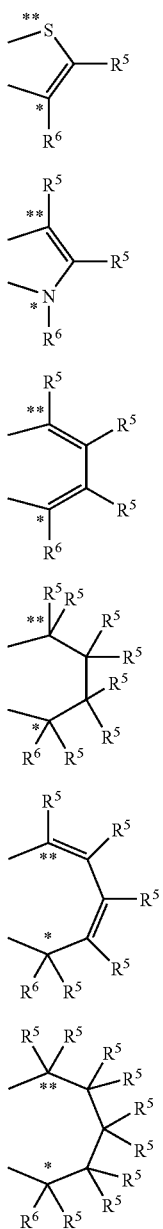

where
the atoms denoted by the symbols * and ** are in each case joined to the atoms of the compound of the formula (I) which are denoted by the same symbol, and $R^5$ and $R^6$ are identical or different and are each, independently of one another, hydrogen or halogen or linear or branched $C_1$-$C_{20}$-alkyl or $C_3$-$C_{20}$-cycloalkyl which may bear one or more $C_1$-$C_{10}$-alkyl radicals as substituents, $C_6$-$C_{40}$-aryl, $C_7$-$C_{40}$-alkylaryl or $C_7$-$C_{40}$-arylalkyl and may contain one or more heteroatoms from groups 13-17 of the Periodic Table of the Elements or one or more unsaturated bonds or two radicals $R^5$ or $R^5$ and $R^6$ are joined to one another to form a saturated or unsaturated $C_3$-$C_{20}$ ring, with at least one organometallic compound of the formula (VIII)

$$M^1(R^7)_r(R^8)_s(R^9)_t \qquad (VIII)$$

where
$M^1$ is an alkali metal, an alkaline earth metal or a metal of group 13 of the Periodic Table, i.e. boron, aluminum, gallium, indium or thallium, $R^7$ is hydrogen, $C_1$-$C_{10}$-alkyl, $C_3$-$C_{10}$-cycloalkyl, $C_6$-$C_{15}$-aryl, alkylaryl or arylalkyl each having from 1 to 10 carbon atoms in the alkyl part and from 6 to 20 carbon atoms in the aryl part, $R^8$ and $R^9$ are each hydrogen, halogen, $C_1$-$C_{10}$-alkyl, $C_3$-$C_{10}$-cycloalkyl, $C_6$-$C_{15}$-aryl, alkylaryl, arylalkyl or alkoxy each having from 1 to 10 carbon atoms in the alkyl part and from 6 to 20 carbon atoms in the aryl part, r is an integer from 1 to 3
and
s and t are integers from 0 to 2, where the sum r+s+t corresponds to the valence of $M^3$,
to the modified support.

Furthermore, we have found catalyst solids obtainable by this process, catalyst systems comprising these catalyst solids, their use for the polymerization of olefins and a process for the polymerization of olefins.

The catalyst solids prepared according to the present invention are suitable for the polymerization of olefins and especially for the polymerization of α-olefins, i.e. hydrocarbons having terminal double bonds. Suitable monomers include functionalized olefinically unsaturated compounds such as ester or amide derivatives of acrylic or methacrylic acid, for example acrylates, methacrylates or acrylonitriles. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene.

Suitable olefins also include ones in which the double bond is part of a cyclic structure which may have one or more ring systems. Examples are cyclopentene, norbornene, tetracyclododecene or methylnorbornene or dienes such as 5-ethylidene-2-norborne, norbornadiene or ethylnorbornadiene.

It is also possible to polymerize mixtures of two or more olefins.

In particular, the catalyst solids of the present invention can be used for the polymerization or copolymerization of ethylene or propylene. As comonomers in the polymerization of ethylene, preference is given to using $C_3$-$C_8$-α-olefins, in particular 1-butene, 1-pentene, 1-hexene and/or 1-octene. Preferred comonomers in the polymerization of propylene are ethylene and/or 1-butene.

In the first step for preparing the catalyst solids of the present invention, a finely divided support is brought into contact with an aluminoxane.

As supports, preference is given to using organic or inorganic, inert solids. In particular, the support can be a porous support such as talc, a sheet silicate, an inorganic oxide or a finely divided polymer powder.

Inorganic oxides suitable as supports may be found among the oxides of elements of groups 2, 3, 4, 5, 13, 14, 15 and 16 of the Periodic Table of the Elements. Preference is given to oxides or mixed oxides of the elements calcium, aluminum, silicon, magnesium and titanium and also corresponding oxide mixtures. Other inorganic oxides which can be used either alone or in combination with the last-mentioned oxidic supports are, for example, $ZrO_2$ or $B_2O_3$. Preferred oxides are silicon dioxide, in particular in the form of a silica gel or a pyrogenic silica, or aluminum oxide. A preferred mixed oxide is, for example, calcined hydrotalcite.

The support materials used preferably have a specific surface area in the range from 10 to 1000 $m^2/g$, preferably from 50 to 500 $m^2/g$ and in particular from 200 to 400 $m^2/g$, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 µm, preferably from 5 to 350 µm and in particular from 10 to 100 µm.

The inorganic support can be subjected to a thermal treatment, for example to remove adsorbed water. Such a drying treatment is generally carried out at from 80 to 300° C., preferably from 100 to 200° C., and is preferably carried out under reduced pressure and/or in an inert gas stream, for example under nitrogen or argon. The inorganic support can also be calcined, in which case it is treated at from 200 to 1000° C. so as to set the concentration of OH groups on the surface and possibly alter the structure of the solid. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $NH_4SiF_6$ leads to fluorination of the silica gel surface, and treatment of silica gels with silanes containing nitrogen-, fluorine- or sulfur-containing groups gives correspondingly modified silica gel surfaces.

Further possible support materials are finely divided polymer powders, for example powders comprising polyolefins such as polyethylene or polypropylene, or polystyrene. These are preferably functionalized polymer supports, e.g. supports based on polystyrenes, via whose functional groups, for example ammonium or hydroxyl groups, the aluminoxane can be immobilized. They should preferably be freed of adhering moisture, solvent residues or other impurities by appropriate purification or drying operations before use.

In the process of the present invention, preference is given to using finely divided supports which have functional groups on their surface. Preferred functional groups are ones containing active hydrogen. Examples of suitable functional groups are hydroxyl groups, primary and secondary amino groups, mercapto groups, silanol groups, carboxyl groups, amido groups or imido groups, with particular preference being given to hydroxyl groups.

As compounds of the aluminoxane type, it is possible to use, for example, the compounds described in WO 00/31090. Particularly useful compounds of this type are open-chain or cyclic aluminoxane compounds of the formula (IX) or (X)

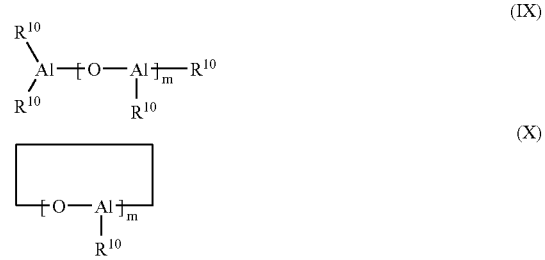

where $R^{10}$ is a $C_1$-$C_4$-alkyl group, preferably a methyl or ethyl group, and m is an integer from 5 to 30, preferably from 10 to 25.

These oligomeric aluminoxane compounds are usually prepared by reaction of a solution of trialkylaluminum with water. In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, preferably aluminum alkyls.

Furthermore, modified aluminoxanes in which some of the hydrocarbon radicals or hydrogen atoms have been replaced by alkoxy, aryloxy, siloxy or amide groups can also be used in place of the aluminoxane compounds of the formula (IX) or (X).

According to the present invention, the finely divided support and the aluminoxane can be brought into contact in any way. However, they are usually combined in the presence of an organic solvent in which the support particles are suspended. Suitable solvents include aromatic or aliphatic solvents, for example hexane, heptane, toluene or xylene, or halogenated hydrocarbons such as methylene chloride or halogenated aromatic hydrocarbons such as o-dichlorobenzene. Particular preference is given to toluene.

The components are generally combined at from −20° C. to +150° C., preferably from 0° C. to 100° C. The time for which the components which have been brought into contact with one another are allowed to react is generally from 1 minute to 48 hours. Preference is given to reaction times of from 10 minutes to 6 hours.

The ratio of the amounts of support and aluminoxane used is preferably such that the aluminum content of the modified support is from 3 to 25% by weight, in particular from 8 to 15% by weight.

If a support having functional groups is used, it is usual to use such an amount of aluminoxane that all functional groups of the support can react with the aluminoxane. The amount of aluminoxane is preferably selected so that essentially the total amount of the aluminoxane used has reacted with the functional groups of the support.

The reaction product of finely divided support and aluminoxane can be used as such, preferably as a suspension, in the subsequent step b). However, the support which has been modified with the aluminoxane is generally dried after the support and aluminoxane have been brought into contact with one another. This drying is generally carried out at from 0° C. to 100° C., preferably from 20° C. to 80° C., under reduced pressure or preferably in a stream of nitrogen. The suspension medium is preferably separated from the aluminoxane-modified support by filtration prior to drying. It is also possible to remove excess aluminoxane which has not been bound to the support via functional groups of the support by washing one or more times prior to drying.

The reaction product of finely divided support and aluminoxane is then, in a second step, combined with the reaction product of a metallocene compound of the formula (I) and an organometallic compound of the formula (VIII).

Among the metallocene compounds of the formula (I), particular preference is given to those in which M is zirconium.

Furthermore, preference is given to metallocene compounds of the formula (I) in which the substituent R in the radicals X is $C_1$-$C_{10}$-alkyl such as methyl, ethyl, n-propyl, isopropyl, n-butyl, isobutyl, sec-butyl, tert-butyl, n-pentyl, n-hexyl, n-heptyl or n-octyl or $C_3$-$C_{20}$-cycloalkyl such as cyclopentyl or cyclohexyl. Preference is also given to metallocene compounds of the formula (I) in which the two radicals X are joined to one another so as to form a $C_4$-$C_{40}$-dienyl ligand, in particular a 1,3-dienyl ligand, or an —OR'O— group in which the substituent R' is a divalent group selected from the group consisting of $C_1$-$C_{40}$-alkylidene, $C_6$-$C_{40}$-arylidene, $C_7$-$C_{40}$-alkylarylidene and $C_7$-$C_{40}$-arylalkylidene. X is particularly preferably a halogen atom or an —R or —OR group or the two radicals X form an —OR'O— group; X is very particularly preferably chlorine or methyl.

In preferred metallocene compounds of the formula (I), the divalent group L is a radical selected from the group consisting of the silylidenes —SiMe$_2$-, —SiPh$_2$-, —SiPhMe- and —SiMe(SiMe$_3$)- and the alkylidenes —CH$_2$—, —(CH$_2$)$_2$—, —(CH$_2$)$_3$— and —C(CH$_3$)$_2$—.

Preferred radicals $R^1$ and $R^2$ in the metallocene compounds of the formula (I) are linear or branched $C_1$-$C_{10}$-alkyl, in particular a linear $C_1$-$C_4$-alkyl group such as methyl, ethyl, n-propyl or n-butyl or a branched $C_3$- or $C_4$-alkyl group such as isopropyl or tert-butyl. In a particularly preferred embodiment, the radicals $R^1$ and $R^2$ are identical and are, in particular, both methyl, ethyl or isopropyl. In a further particularly preferred embodiment, $R^1$ is a linear or branched $C_1$-$C_{10}$-alkyl group which is unbranched in the α position, in particular a linear $C_1$-$C_4$-alkyl group such as methyl, ethyl, n-propyl or n-butyl, and $R^2$ is a $C_1$-$C_{10}$-alkyl group which is branched in the α position, in particular a branched $C_3$- or $C_4$-alkyl group such as isopropyl or tert-butyl.

In preferred metallocene compounds of the formula (I), the radicals $R^5$ are each hydrogen or a linear or branched $C_1$-$C_{10}$-alkyl group or a $C_3$-$C_{10}$-cycloalkyl group, in particular a linear $C_1$-$C_4$-alkyl group such as methyl, ethyl, n-propyl or n-butyl.

Furthermore, preference is given to metallocene compounds of the formula (I) in which $R^6$ together with an adjacent radical $R^5$ forms a cyclic system, in particular a saturated 6-membered ring, or $R^6$ is an aryl group of the formula (XI),

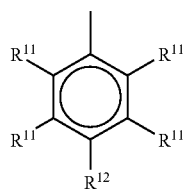

(XI)

where
$R^{11}$ are identical or different and are each, independently of one another, hydrogen or halogen or linear or branched $C_1$-$C_{20}$-alkyl, $C_3$-$C_{20}$-cycloalkyl which may bear one or more $C_1$-$C_{10}$-alkyl radicals as substituents, $C_6$-$C_{20}$-aryl, $C_7$-$C_{20}$-alkylaryl or $C_7$-$C_{20}$-arylalkyl and may contain one or more heteroatoms from groups 13-17 of the Periodic Table of the Elements or one or more unsaturated bonds, or two radicals $R^{11}$ may be joined to form a saturated or unsaturated $C_3$-$C_{20}$ ring, with preference being given to $R^{11}$ being a hydrogen atom, and $R^{12}$ is hydrogen or halogen or linear or branched $C_1$-$C_{20}$-alkyl, $C_3$-$C_{20}$-cycloalkyl which may bear one or more $C_1$-$C_{10}$-alkyl radicals as substituents, $C_6$-$C_{20}$-aryl, $C_7$-$C_{20}$-alkylaryl or $C_7$-$C_{20}$-arylalkyl and may contain one or more heteroatoms from groups 13-17 of the Periodic Table of the Elements or one or more unsaturated bonds, with preference being given to $R^{12}$ being a branched alkyl group of the formula —C($R^{13}$)$_3$, where $R^{13}$ are identical or different and are each, independently of one another, a linear or branched $C_1$-$C_6$-alkyl group or two or three radicals $R^{13}$ are joined to form one or more ring systems.

In a preferred embodiment of the present invention, at least one of the groups T and T' is substituted by a radical $R^6$ of the formula (XI). Particular preference is given to both groups T and T' being substituted by such a radical. Very particular preference is then given to at least one of the groups T and T' being a group of the formula (IV) which is substituted by a radical $R^6$ of the formula (XI) and the other having either the formula (II) or (IV) and likewise being substituted by a radical $R^6$ of the formula (VII). In particular, such metallocene compounds have the formula (XII)

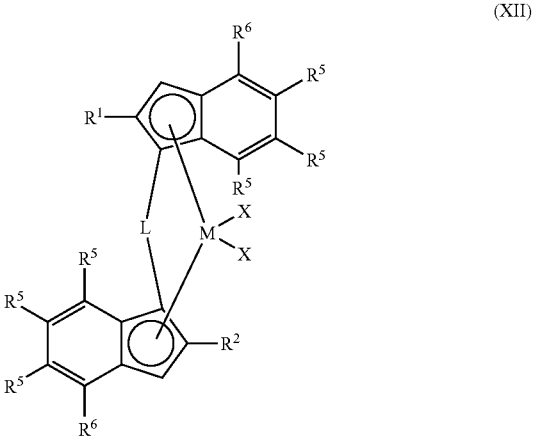

(XII)

Particularly useful metallocene compounds and processes for preparing them are described, for example, in WO 01/48034 and WO 03/045964.

The metallocene compounds of the formula (I) are preferably used in the rac or pseudo-rac form; the term psuedo-rac form refers to complexes in which the two groups T and T' are in the rac arrangement relative to one another when all other substituents of the complex are disregarded.

It is also possible to use mixtures of various metallocene compounds.

Examples of particularly useful metallocene compounds of the formula (I) are dimethylsilanediylbis(indenyl)zirconium dichloride, dimethylsilanediylbis(tetrahydroindenyl)zirconium dichloride, ethylenebis(indenyl)zirconium dichloride, ethylenebis(tetrahydroindenyl)zirconium dichloride, dimethylsilanediylbis(2-methylindenyl)zirconium dichloride, dimethylsilanediylbis(2-isopropylindenyl)zirconium dichloride, dimethylsilanediylbis(2-tert-butylindenyl)zirconium dichloride, diethylsilanediylbis(2-methylindenyl)zirconium dibromide, dimethylsilanediylbis(2-ethylindenyl)zirconium dichloride, dimethylsilanediylbis(2-methyl-4,5-benzindenyl)zirconium dichloride dimethylsilanediylbis(2-ethyl-4,5-benzindenyl)zirconium dichloride methylphenylsilanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilanediylbis(2-methylindenyl)hafnium dichloride, dimethylsilanediylbis(2-methyl-4-phenylindenyl)zirconium dichloride, dimethylsilanediylbis(2-ethyl-4-phenylindenyl) zirconium dichloride, dimethylsilanediylbis(2-methyl-4-(1-naphthyl)indenyl)zirconium dichloride, dimethylsilanediylbis(2-ethyl-4-(1naphthyl)-indenyl)zirconium dichloride, dimethylsilanediylbis(2-propyl-4-(1-naphthyl)indenyl)zirconium dichloride, dimethylsilanediylbis(2-i-butyl-4-(1-naphthyl)indenyl)zirconium dichloride, dimethylsilanediylbis(2-propyl-4-(9-phenanthryl)indenyl)zirconium dichloride, dimethylsilanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)zirconium dichloride, dimethylsilanediylbis(2-methyl-4-(p-trifluoromethylphenyl)indenyl)zirconium dichloride, dimethylsilanediylbis(2-methyl-4-(3',5'-dimethylphenyl)indenyl)zirconium dichloride, dimethylsilanediylbis(2-methyl-4-(4'-tert-butylphenyl)indenyl)zirconium dichloride, diethylsilanediylbis(2-methyl-4-(4'-tert-butylphenyl)indenyl)zirconium dichloride, dimethylsilanediylbis(2-ethyl-4-(4'-tert-butylphenyl)indenyl)zirconium dichloride, dimethylsilanediylbis(2-propyl-4-(4'-tert-butylphenyl)indenyl) zirconium dichloride, dimethylsilanediylbis(2-isopropyl-4-(4'-tert-butylphenyl)indenyl)zirconium dichloride, dimethylsilanediylbis(2-n-butyl-4-(4'-tert-butylphenyl)indenyl)zirconium dichloride, dimethylsilanediylbis(2-hexyl-4-(4'-tert-butylphenyl)indenyl)zirconium dichloride, dimethylsilanediyl(2-isopropyl-4-phenylindenyl)(2-methyl-4-phenylindenyl)zirconium dichloride, dimethylsilanediyl(2-isopropyl-4-(1-naphthyl)indenyl)(2-methyl-4-(1-naphthyl)indenyl)zirconium dichloride, dimethylsilanediyl(2-isopropyl-4-(4'-tert-butylphenyl)indenyl)(2-methyl-4-(4'-tert-butylphenyl)indenyl)zirconium dichloride, dimethylsilanediyl(2-isopropyl-4-(4'-tert-butylphenyl)indenyl)(2-ethyl-4-(4'-tert-butylphenyl)indenyl)zirconium dichloride, dimethylsilanediyl(2-isopropyl-4-(4'-tert-butylphenyl)indenyl)(2-methyl-4-(3',5'-bis-tert-butylphenyl)indenyl)zirconium dichloride, dimethylsilanediyl(2-isopropyl-4-(4'-tert-butylphenyl)indenyl)(2-methyl-4-(1'-naphthyl)indenyl)zirconium dichloride ethylene(2-isopropyl-4-(4'-tert-butylphenyl)indenyl)(2-methyl-4-(4'-tert-butylphenyl)indenyl)zirconium dichloride dimethylsilanediyl(2-methyl-4-(4'-tert-butylphenyl)indenyl) 2-isopropyl-4-(1-naphtyl)indenyl)-zirconium dichloride, dimethylsilanediyl(2-methyl-4-phenyl)-1-indenyl)(2-isopropyl-4-(4'-tert-butylphenyl)-1-indenyl)-zirconium dichloride, dimethylsilanediyl(2-methyl-thiapentenyl)(2-isopropyl-4-(4'-tert-butylphenyl)indenyl)zirconium dichloride, dimethylsilanediyl(2-isopropyl-4-(4'-tert-butylphenyl)indenyl)(2-methyl-4,5-benzoindenyl)zirconium dichloride, dimethylsilanediyl(2-methyl-4-(4'-tert-butylphenyl)indenyl)(2-isopropyl-4-phenylindenyl)zirconium dichloride, dimethylsilanediyl(2-ethyl-4-(4'-tert-butylphenyl)indenyl)(2-isopropyl-4-phenyl)indenyl)zirconium dichloride or and also the corresponding dimethylzirconium, monochloromono(alkylaryloxy)zirconium and di(alkylaryloxy)zirconium compounds.

Among the organometallic compounds of the formula (VIII), preference is given to those in which $R^7$ is hydrogen, $C_1$-$C_{10}$-alkyl or $C_3$-$C_{10}$-cycloalkyl and $R^8$ and $R^9$ are each hydrogen, halogen, $C_1$-$C_{10}$-alkyl or $C_3$-$C_{10}$-cycloalkyl. Particular preference is given to at least one of the radicals $R^7$, $R^8$ and $R^9$ being a branched alkyl radical having from one to 10 carbon atoms or a cycloalkyl radical having from 3 to 10 carbon atoms.

Preference is also given to organometallic compounds in which $M^1$ is lithium, boron, magnesium or aluminum, in particular aluminum.

It is also possible to use mixtures of various organometallic compounds of the formula (VIII).

Particularly preferred organometallic compounds of the formula (VIII) are n-butyllithium, n-butyl-n-octymagnesium, n-butyl-n-heptylmagnesium, triphenylaluminum, triisoprenylaluminum, tri-n-octylaluminum, tri-n-hexylaluminum, tri-n-butylaluminum, triisobutylaluminum, tri-n-propylaluminum, triisopropylaluminum, triethylaluminum, trimethylaluminum, diisobutylaluminum hydride and trispentafluorophenylborane or mixtures thereof.

Very particularly preferred organometallic compounds of the formula (VIII) are triisobutylaluminum, diisobutylaluminum hydride or mixtures thereof.

The reaction of the metallocene of the formula (I) and organometallic compounds of the formula (VIII) usually occurs in the presence of an organic solvent in which the reaction product is partly or preferably completely dissolved after the reaction. Suitable solvents include aromatic or aliphatic solvents, for example hexane, heptane, toluene or xylene. Particular preference is given to heptane or toluene or mixtures thereof.

The modified support and the reaction product of metallocene and organometallic compound can be combined in any way.

In a preferred procedure, the modified support and the reaction product of metallocene and organometallic compound are combined by passing the solution of the reaction product of metallocene and organometallic compound through the support in a directed flow. The components are then usually brought into contact with one another in a column-shaped, cylindrical or tubular reaction vessel which is provided with an inlet and an outlet and is filled with a bed of the support through which the solution of the reaction product of metallocene and organometallic compound is allowed to flow. The components are generally combined at from −20° C. to 150° C., preferably from 0° C. to 100° C. The time for which the components which have been brought into contact with one another are allowed to react is generally from 1 minute to 48 hours. Preference is given to reaction times of from 10 minutes to 6 hours. Such a procedure is known from WO 00/05277.

In a further preferred procedure, the modified support and the reaction product are metallocene and organometallic compound are brought into contact with one another in suspension at from 0 to 100° C., preferably from 10 to 40° C., for from 30 minutes to 10 hours, preferably from 1 to 4 hours. The solvent is subsequently removed by evaporation at from 0 to 100° C., preferably from 60 to 90° C., and a pressure of from 0.01 to 100 mbar, preferably from 1.0 to 10 mbar, to give a free-flowing catalyst solid.

It has been found to be advantageous to use the metallocene compound and the aluminoxane in such amounts that the atomic ratio of aluminum from the aluminoxane compounds to the transition metal from the metallocene compound is in the range from 10:1 to 1000:1, preferably from 20:1 to 500:1 and in particular in the range from 30:1 to 400:1.

The organometallic compound of the formula (VIII) is preferably used in such an amount that the molar ratio of $M^1$ from the compound of the formula (VIII) to the transition metal from the metallocene compound of from 800:1 to 1:1, in particular from 200:1 to 2:1.

The reaction mixture obtained in the process of the present invention after reaction of the modified support with the reaction product of metallocene and organometallic compound is usually worked up further, preferably by drying of the solid. If a suspension is present, the solid can additionally be separated off from the liquid phase beforehand, for example by filtration. Drying is generally carried out at temperatures above room temperature. A vacuum is preferably applied during drying. The residual solvent content of the solid after drying should preferably be less than 20% by weight, in particular less than 5% by weight. The dried catalyst solid can be used as such or in resuspended form for the polymerization. Preferred suspension media for resuspension are aliphatic solvents such as heptane or isododecane or high-boiling hydrocarbons such as white oil.

It is also possible for the catalyst solid firstly to be prepolymerized with α-olefins, preferably linear $C_2$-$C_{10}$-1-alkenes, in particular ethylene or propylene, and the resulting prepolymerized catalyst solid then to be used in the actual polymerization. The mass ratio of catalyst solid used in the prepolymerization to monomer polymerized onto it is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system. The molar ratio of additives to organometallic transition metal compound A) is usually from 1:1000 to 1000:1, preferably from 1:5 to 20:1.

The catalyst systems of the present invention which comprise the catalyst solids of the present invention are used, in particular, for the polymerization of olefins. The polymerization can be carried out in a known manner in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes and gas-phase fluidized-bed processes are all possible.

As solvent or suspension medium, use is made of inert hydrocarbons, for example isobutane, or else the monomers themselves.

The polymerization can be carried out at from −60 to 300° C. and pressures in the range from 0.5 to 3000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. Molar mass regulators, for example hydrogen, or customary additives such as antistatics can also be used in the polymerization.

The catalyst solids of the present invention have the advantage that despite a significantly reduced aluminoxane content, they have a very good productivity and lead to polymers having a good morphology and also do not form any deposits in the polymerization reactors during the polymerization. They can be prepared without complicated process steps such as a prepolymerization or multiple washing steps.

EXAMPLES

Example 1 a) Preparation of the Catalyst Solid 8 g of a silica gel (XPO 2107 from Grace) which had been dried for 8 hours at 180° C. and 1 mbar was suspended in 65 ml of toluene under an $N_2$ atmosphere. 14.7 ml of a 4.75 molar solution of methylaluminoxane (MAO; corresponding to 8.7 mmol of Al/g of $SiO_2$) in toluene were added to this suspension over a period of 30 minutes and the mixture was stirred for two hours. The solid was then filtered off and dried in a stream of nitrogen until it was free flowing.

The silica gel which had been pretreated with MAO was placed in a Schlenk frit under inert conditions. In a separate flask, 230 mg of rac-dimethylsilanediylbis(2-methyl-4,5-benzindenyl)-zirconium dichloride were dissolved in 12 ml of a 2 molar solution of triisobutylaluminum in heptane (corresponding to 3.0 mmol of Al/g of $SiO_2$) and 33 ml of toluene. After the solution had been stirred for another two hours, the pretreated silica gel in the Schlenk frit was carefully covered with it. After 15 minutes, the supernatant solution had drained. The outlet clock was closed and the silica gel was stirred thoroughly. After 1 hour, the residual solution was pushed through by means of nitrogen and the catalyst was dried to constant weight in a fluidizing stream of nitrogen. This gave 13.2 g of a bright yellow, free-flowing powder.

b) Polymerization in a 1 l Autoclave 4 mmol of triisobutylaluminum (2 ml of a 2 molar solution in heptane) were placed in a dry 1 l autoclave which had been flushed with nitrogen. 350 g of liquid propylene were added and 50 mg of the catalyst solid prepared in Example 1a) was shot in by means of nitrogen via a lock, the autoclave was heated to 65° C. and the polymerization was carried out at this temperature. After one hour, the polymerization was stopped by venting the residual propylene and the product was discharged through a bottom valve. This gave 205 g of pulverulent polypropylene having a good morphology (productivity: 4100 g of PP/g of catalyst). Subsequent inspection of the autoclave revealed no deposits or lumps.

c) Polymerization in a 10 l Autoclave 10 ml of triisobutylaluminum (2 molar solution in heptane) were introduced in a countercurrent of nitrogen into a dry 10 l autoclave which had been flushed with nitrogen. 410 mg of the catalyst solid prepared in Example 1a) and 7 l of liquid propylene were subsequently added and the mixture was stirred at room temperature for about 10 minutes. The autoclave was subsequently heated to 65° C. and the polymerization was carried out at this temperature. After 1.5 hours, the polymerization was stopped by removal of the residual propylene and the product was discharged via a bottom valve. This gave 2540 g of pulverulent polypropylene having a good morphology (productivity: 6200 g of PP/g of catalyst). Subsequent inspection of the autoclave revealed no deposits or lumps.

Example 2

Example 1 was repeated using only 8.8 ml of the 4.75 molar solution of MAO in toluene (corresponding to 5.2 mmol of Al/g of $SiO_2$) in the preparation of the catalyst solid and 18 ml of the 2 molar solution of triisobutylaluminum in heptane (corresponding to 4.5 mmol of Al/g of $SiO_2$) for preparing the solution of the metallocene. This gave 13.2 g of a bright yellow, free-flowing powder.

The polymerization in the 1 l autoclave was carried out using 45 mg of the catalyst solid. The productivity was 3900 g of PP/g of catalyst. Inspection of the autoclave revealed no deposits or lumps.

The polymerization in the 10 l autoclave was carried out using 500 mg of catalyst solid. The productivity was 5500 g of PP/g of catalyst. Inspection of the autoclave revealed no deposits or lumps.

Example 3

Example 1 was repeated using 8 ml of a 2 molar solution of diisobutylaluminum hydride in heptane (corresponding to 2 mmol of Al/g of $SiO_2$) in place of the 2 molar solution of triisobutylaluminum in heptane for preparing the solution of the metallocene. This gave 12.8 g of a bright yellow, free-flowing powder.

The polymerization was carried out only in the 1 l autoclave using 65 mg of the catalyst solid. The productivity was 3950 g of PP/g of catalyst. Inspection of the autoclave revealed no deposits or lumps.

Example 4

8 g of the dried silica gel used in Example 1 were suspended in 65 ml of toluene under an $N_2$ atmosphere. 14.7 ml of a 4.75 molar solution of MAO (corresponding to 8.7 mmol of Al/g of $SiO_2$) in toluene were added to this suspension over a period of 30 minutes, with the internal temperature not exceeding 30° C. After stirring for 2 hours, the solid was filtered off and dried in a stream of nitrogen until it was free flowing.

The support which had been pretreated in this way was transferred to a flask which had been made inert. A solution of 230 mg of rac-dimethylsilanediylbis(2-methyl-4,5-benzindenyl)zirconium dichloride, 20 ml of toluene, 18 ml of a 1 molar solution of diisobutylaluminum hydride in heptane (corresponding to 2.25 mmol of Al/g of $SiO_2$) and 3 ml of a 2 molar solution of triisobutylaluminum in heptane (corresponding to 0.75 mmol of Al/g of $SiO_2$) were added thereto and the mixture was stirred for 2 hours. The solvent and excess aluminum alkyl was subsequently distilled off at 80° C. in an oil pump vacuum. This gave 15.4 g of a bright yellow, free-flowing powder.

The polymerization was carried out as in Example 1. The polymerization in the 1 l autoclave was carried out using 35 mg of the catalyst solid. The productivity was 4700 g of PP/g of catalyst. Inspection of the autoclave revealed no deposits or lumps.

The polymerization in the 10 l autoclave was carried out using 350 mg of catalyst solid. The productivity was 8900 g of PP/g of catalyst. Inspection of the autoclave revealed no deposits or lumps.

Example 5

8 g of the dried silica gel used in Example 1 were suspended in 65 ml of toluene under an $N_2$ atmosphere. 14.7 ml of a 4.75 molar solution of MAO (corresponding to 8.7 mmol of Al/g of $SiO_2$) in toluene were added to this suspension over a period of 30 minutes, with the internal temperature not exceeding 30° C. After stirring for 2 hours, a solution of 230 mg of rac-dimethylsilanediylbis(2-methyl-4,5-benzindenyl) zirconium dichloride, 20 ml of toluene, 18 ml of a 1 molar solution of diisobutylaluminum hydride in heptane (corresponding to 2.25 mmol of Al/g of $SiO_2$) and 3 ml of a 2 molar solution of triisobutylaluminum in heptane (corresponding to 0.75 mmol of Al/g of $SiO_2$) were added thereto and the mixture was stirred for a further 2 hours. The solvent and excess aluminum alkyl was subsequently distilled off at 80° C. in an oil pump vacuum. This gave 15.4 g of a bright yellow, free-flowing powder.

The polymerization was carried out as in Example 1. The polymerization in the 1 l autoclave was carried out using 40 mg of the catalyst solid. The productivity was 4500 g of PP/g of catalyst. Inspection of the autoclave revealed no deposits or lumps.

The polymerization in the 10 l autoclave was carried out using 360 mg of catalyst solid. The productivity was 7200 g of PP/g of catalyst. Inspection of the autoclave revealed no deposits or lumps.

Comparative Example A

Example 1 was repeated using 9.4 ml of a 4.75 molar solution of MAO in toluene (corresponding to 5.6 mmol of Al/g of $SiO_2$) in place of the 2 molar solution of triisobutylaluminum in heptane for preparing the solution of the metallocene. This gave 15.0 g of a bright orange, free-flowing powder.

The polymerization in the 1 l autoclave was carried out using 55 mg of the catalyst solid. The productivity was 4200 g of PP/g of catalyst. Inspection of the autoclave revealed no deposits or lumps.

The polymerization in the 10 l autoclave was carried out using 400 mg of catalyst solid. The productivity was 5500 g of PP/g of catalyst. Inspection of the autoclave revealed no deposits or lumps.

Comparative Example B 8 g of the dried silica gel used in Example 1 were suspended in 65 ml of heptane. 32 ml of a 2 molar solution of triisobutylaluminum in heptane were added to this suspension over a period of 30 minutes while stirring, with the internal temperature not exceeding 30° C. After stirring for 2 hours, the solid was filtered off, washed 3 times with 50 ml each time of toluene and dried in a stream of nitrogen until it was free flowing.

The further preparation of the catalyst solid was carried out as in Example 1 using the silica gel which had been pretreated with triisobutylaluminum as described above, but 16.8 ml of a 4.75 molar solution of MAO in toluene (corresponding to 10.0 mmol of Al/g of $SiO_2$) were used in place of the 2 molar solution of triisobutylaluminum in heptane. This gave 12.0 g of a bright orange, free-flowing powder.

The polymerization was carried out only in the 1 l autoclave using 79 mg of the catalyst solid. The productivity was 1700 g of PP/g of catalyst. Inspection of the autoclave revealed heavy deposits on the wall and stirrer and also lumps in the polypropylene powder.

In all examples and comparative examples, a polymerization was carried out in a 1 l autoclave and frequently also in a 10 l autoclave. While the polymerization in the 1 l autoclave allows fundamental conclusions regarding the morphology of the polymers which can be prepared and a rough assessment of the productivity to be obtained, the polymerization in the 10 l autoclave allows clear differentiation between the individual catalyst solids, particularly in the case of catalyst solids having a relatively high productivity.

The results show that the catalyst solids of the present invention give a good morphology of the resulting polymer and an improved productivity despite a reduction in the amount of MAO or allow the amount of MAO used to be reduced significantly while maintaining the same productivity.

We claim:

1. A process for preparing a catalyst solid for olefin polymerization comprising a finely divided support, an aluminoxane, a metallocene compound product, and an organometallic compound, wherein, the process consists essentially of:
   combining the finely divided support with the aluminoxane to form a modified support, removing excess aluminoxane not bound to the modified support, drying the modified support, and subsequently reacting a metallocene compound of formula (I),

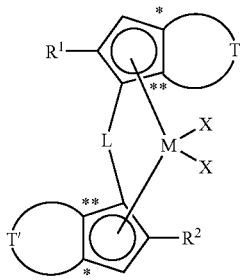

(I)

where

M is zirconium, hafnium or titanium;

X are identical or different and are each, independently of one another, hydrogen or halogen or a group —R, —OR, —OSO$_2$CF$_3$, —OCOR, —SR, —NR$_2$ or —PR$_2$, where R is linear or branched C$_1$-C$_{20}$-alkyl, C$_3$-C$_{20}$-cycloalkyl which may bear one or more C$_1$-C$_{10}$-alkyl radicals as substituents, C$_6$-C$_{20}$-aryl, C$_7$-C$_{20}$-alkylaryl or C$_{7}$-$_{020}$-arylalkyl and may contain one or more heteroatoms from groups 13-17 of the Periodic Table of the Elements or one or more unsaturated bonds, with the two radicals X also being able to be joined to one another;

L is a divalent bridging group selected from the group consisting of C$_1$-C$_{20}$-alkylidene, C$_3$-C$_{20}$-cycloalkylidene, C$_6$-C$_{20}$-arylidene, C$_7$-C$_{20}$-alkylarylidene and C$_7$-C$_{20}$-arylalkylidene radicals which may contain heteroatoms from groups 13-17 of the Periodic Table of the Elements or is a silylidene group having up to 5 silicon atoms;

R$^1$ and R$^2$ are identical or different and are each, independently of one another, hydrogen or linear or branched C$_1$-C$_{20}$-alkyl or C$_3$-C$_{20}$-cycloalkyl which may bear one or more C$_1$-C$_{10}$-alkyl radicals as substituents, C$_6$-C$_{20}$-aryl, C$_7$-C$_{40}$-alkylaryl or C$_7$-C$_{40}$-arylalkyl and may contain one or more heteroatoms from groups 13-17 of the Periodic Table of the Elements or one or more unsaturated bonds;

T and T' are divalent groups of the formulae (II), (III), (IV), (V), (VI) or (VII),

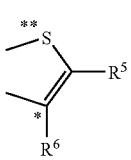

(II)

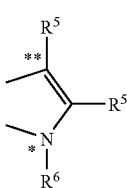

(III)

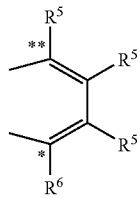

(IV)

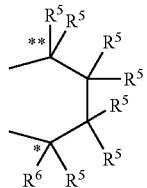

(V)

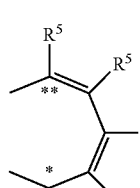

(VI)

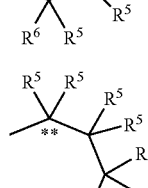

(VII)

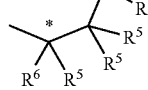

where the atoms denoted by the symbols * and ** are in each case joined to the atoms of the compound of the formula (I) which are denoted by the same symbol; and R$^5$ and R$^6$ are identical or different and are each, independently of one another, hydrogen or halogen or linear or branched C$_1$-C$_{20}$-alkyl or C$_3$-C$_{20}$-cycloalkyl which may bear one or more C$_1$-C$_{10}$-alkyl radicals as substituents, C$_6$-C$_{40}$-aryl, C$_7$-C$_{40}$-alkylaryl or C$_7$-C$_{40}$-arylalkyl and may contain one or more heteroatoms from groups 13-17 of the Periodic Table of the Elements or one or more unsaturated bonds or two radicals R$^5$ or R$^5$ and R$^6$ are joined to one another to form a saturated or unsaturated C$_3$-C$_{20}$ ring;

with at least one organometallic compound of formula (VIII)

$$M^1(R^7)_r(R^8)_s(R^9)_t$$ (VIII)

where

M$^1$ is an alkali metal, an alkaline earth metal or a metal of group 13 of the Periodic Table;

R$^7$ is hydrogen, C$_1$-C$_{10}$-alkyl, C$_3$-C$_{10}$-cycloalkyl, C$_6$-C$_{15}$-aryl, alkylaryl or arylalkyl each having from 1 to 10 carbon atoms in the alkyl part and from 6 to 20 carbon atoms in the aryl part;

R$^8$ and R$^9$ are each hydrogen, halogen, C$_1$-C$_{10}$-alkyl, C$_3$-C$_{10}$-cycloalkyl, C$_6$-C$_{15}$-aryl, alkylaryl, arylalkyl or alkoxy each having from 1 to 10 carbon atoms in the alkyl part and from 6 to 20 carbon atoms in the aryl part;

r is an integer from 1 to 3 and s and t are integers from 0 to 2, where the sum r+s+t corresponds to the valence of M$^3$; wherein the organometallic compounds of formula (VIII) comprise at least one branched alkyl radical comprising up to 10 carbon atoms, or a cycloalkyl radical comprising from 3 to 10 carbon atoms;

to form a reaction product which is added to the modified support, wherein the finely divided support and aluminoxane are combined in suspension, and the reaction product and the modified support are contacted in suspension with the suspension medium being removed by evaporation after the reaction product is contacted with the modified support.

2. The process for preparing a catalyst solid for olefin polymerization as claimed in claim 1, wherein the finely divided support comprises functional groups, and the finely divided support and an amount of the aluminoxane are selected so that essentially the total amount of the aluminoxane used has reacted with the functional groups of the finely divided support.

3. The process for preparing a catalyst solid for olefin polymerization as claimed in claim 1, wherein the organometallic compound of formula (VIII) is triisobutylaluminum, diisobutylaluminum hydride or a mixture of the two compounds.

4. A catalyst solid obtained by the process as claimed in claim 1.

5. A catalyst system for polymerizing olefins, comprising said catalyst solid as claimed in claim 4.

6. A process for polymerizing olefins which comprises using the catalyst system as claimed in claim 5.

7. A process for preparing a catalyst solid for olefin polymerization as claimed in claim 2, wherein the organometallic compound of formula (VIII) which is used is triisobutylaluminum, diisobutylaluminum hydride or a mixture of the two compounds.

8. A catalyst solid obtained by the process as claimed in claim 7.

9. A process for polymerizing olefins which comprises using the catalyst system as claimed in claim 8.

10. A process for preparing a catalyst solid for olefin polymerization comprising a finely divided support, an aluminoxane, a metallocene compound product, and an organometallic compound, wherein the process consists essentially of:

combining the finely divided support with the aluminoxane to form a modified support, removing excess aluminoxane not bound to the modified support, drying the modified support, and subsequently reacting a metallocene compound of formula (I),

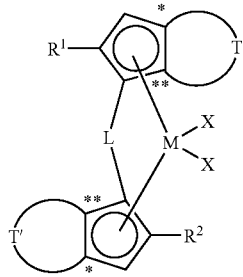

(I)

where

M is zirconium, hafnium or titanium;

X are identical or different and are each, independently of one another, hydrogen or halogen or a group —R, —OR, —OSO$_2$CF$_3$, —OCOR, —SR, —NR$_2$ or —PR$_2$, where R is linear or branched C$_1$-C$_{20}$-alkyl, C$_3$-C$_{20}$-cycloalkyl which may bear one or more C$_1$-C$_{10}$-alkyl radicals as substituents, C$_6$-C$_{20}$-aryl, C$_7$-C$_{20}$-alkylaryl or C$_7$-C$_{20}$-arylalkyl and may contain one or more heteroatoms from groups 13-17 of the Periodic Table of the Elements or one or more unsaturated bonds, with the two radicals X also being able to be joined to one another;

L is a divalent bridging group selected from the group consisting of C$_1$-C$_{20}$-alkylidene, C$_3$-C$_{20}$-cycloalkylidene, C$_6$-C$_{20}$-arylidene, C$_7$-C$_{20}$-alkylarylidene and C$_7$-C$_{20}$-arylalkylidene radicals which may contain heteroatoms from groups 13-17 of the Periodic Table of the Elements or is a silylidene group having up to 5 silicon atoms;

R$^1$ and R$_2$ are identical or different and are each, independently of one another, hydrogen or linear or branched C$_1$-C$_{20}$-alkyl or C$_3$-C$_{20}$-cycloalkyl which may bear one or more C$_1$-C$_{10}$-alkyl radicals as substituents, C$_6$-C$_{20}$-aryl, C$_7$-C$_{40}$-alkylaryl or C$_7$-C$_{40}$-arylalkyl and may contain one or more heteroatoms from groups 13-17 of the periodic Table of the Elements or one or more unsaturated bonds;

T and T' are divalent groups of the formulae (II), (III), (IV), (V), (VI), (VIII),

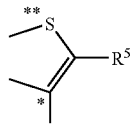

(II)

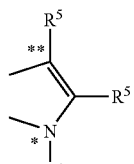

(III)

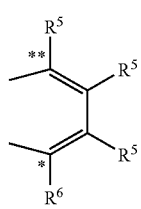

(IV)

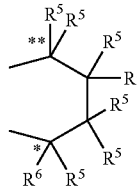

(V)

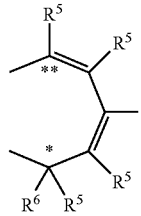

(VI)

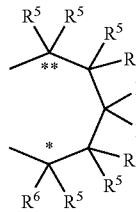

(VII)

where the atoms denoted by the symbols * and ** are in each case joined to the atoms of the compound of the formula (I) which are denoted by the same symbol; and $R_5$ and $R_6$ are identical or different and are each, independently of one another, hydrogen or halogen or linear or branched $C_1$-$C_{20}$-alkyl or $C_3$-$C_{20}$-cycloalkyl which may bear one or more $C_1$-$C_{10}$-alkyl radicals as substituents, $C_6$-$C_{40}$-aryl, $C_7$-$C_{40}$-alkylaryl or $C_7$-$C_{40}$-arylalkyl and may contain one or more heteroatoms from groups 13-17 of the Periodic Table of the Elements or one or more unsaturated bonds or two radicals $R^5$ or $R^5$ and $R^6$ are joined to one another to form a saturated or unsaturated $C_3$-$C_{20}$ ring;

with at least one organometallic compound of formula (VIII)

$$M^1(R^7)_r(R^8)_s(R^9)_t \quad\quad\quad (VIII)$$

where $M^1$ is an alkali metal, an alkaline earth metal or a metal of group 13 of the Periodic Table;

$R^7$ is hydrogen, $C_1$-$C_{10}$-alkyl, $C_3$-$C_{10}$-cycloalkyl, $C_6$-$C_{15}$-aryl, alkylaryl or arylalkyl each having from 1 to 10 carbon atoms in the alkyl part and from 6 to 20 carbon atoms in the aryl part;

$R^8$ and $R^9$ are each hydrogen, halogen, $C_1$-$C_{10}$-alkyl, $C_3$-$C_{10}$-cycloalkyl, $C_6$-$C_{15}$-aryl, alkylaryl, arylalkyl or alkoxy each having from 1 to 10 carbon atoms in the alkyl part and from 6 to 20 carbon atoms in the aryl part;

r is an integer from 1 to 3;

and s and t are integers from 0 to 2, where the sum r+s+t corresponds to the valence of $M^3$; wherein the organometallic compounds of formula (VIII) comprise at least one branched alkyl radical comprising up to 10 carbon atoms, or a cycloalkyl radical comprising from 3 to 10 carbon atoms, and the molar ratio of $M^1$ from the organometallic compounds of formula (VIII) to M from the metallocene compounds of formula (I) ranges from 800:1 to 1:1;

to form a reaction product which is added to the modified support, wherein the finely divided support and aluminoxane are combined in suspension, and the reaction product and the modified support are contacted in suspension with the suspension medium being removed by evaporation after the reaction product is contacted with the modified support.

11. The process according to claim 10, wherein the molar ratio of $M^1$ from the organometallic compounds of formula (VIII) to N from the metallocene compounds of formula (I) ranges from 200:1 to 2:1.

12. The process for preparing a catalyst solid for olefin polymerization as claimed in claim 10, wherein the finely divided support comprises functional groups, and the finely divided support and an amount of the aluminoxane are selected so that essentially the total amount of the aluminoxane used has reacted with the functional groups of the finely divided support.

13. The process for preparing a catalyst solid for olefin polymerization as claimed in claim 10, wherein the organometallic compound of formula (VIII) is triisobutylaluminum, diisobutylaluminum hydride or a mixture of the two compounds.

14. A catalyst solid obtained by the process as claimed in claim 10.

15. A catalyst system for polymerizing olefins, comprising said catalyst solid as claimed in claim 14.

16. A process for polymerizing olefins which comprises using the catalyst system as claimed in claim 15.

17. A process for preparing a catalyst solid for olefin polymerization as claimed in claim 12, wherein the organometallic compound of formula (VIII) which is used is triisobutylaluminum, diisobutylaluminum hydride or a mixture of the two compounds.

18. A catalyst solid obtained by the process as claimed in claim 17.

19. A process for polymerizing olefins which comprises using the catalyst system as claimed in claim 18.

20. A process for preparing a catalyst solid for olefin polymerization comprising a finely divided support, an aluminoxane, a metallocene compound product, and an organometallic compound, wherein the process consists essentially of:

combining the finely divided support with the aluminoxane to form a modified support, removing excess aluminoxane not bound to the modified support, drying the modified support, and subsequently reacting a metallocene compound of formula (I),

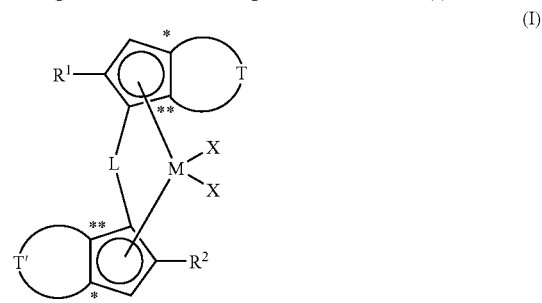

(I)

where

M is zirconium, hafnium or titanium;

X are identical or different and are each, independently of one another, hydrogen or halogen or a group —R, —OR, —OSO$_2$CF$_3$, —OCOR, —SR, —NR$_2$ or —PR$_2$, where R is linear or branched $C_1$-$C_{20}$-alkyl, $C_3$-$C_{20}$-cycloalkyl which may bear one or more $C_1$-$C_{10}$-alkyl radicals as substituents, $C_6$-$C_{20}$-aryl, $C_7$-$C_{20}$-alkylaryl or $C_7$-$C_{20}$-arylalkyl and may contain one or more heteroatoms from groups 13-17 of the Periodic Table of the Elements or one or more unsaturated bonds, with the two radicals X also being able to be joined to one another;

L is a divalent bridging group selected from the group consisting of $C_1$-$C_{20}$-alkylidene, $C_3$-$C_{20}$-cycloalkylidene, $C_6$-$C_{20}$-arylidene, $C_7$-$C_{20}$-alkylarylidene and $C_7$-$C_{20}$-arylalkylidene radicals which may contain heteroatoms from groups 13-17 of the Periodic Table of the Elements or is a silylidene group having up to 5 silicon atoms;

$R_1$ and $R_2$ are identical or different and are each, independently of one another, hydrogen or linear or branched $C_1$-$C_{20}$-alkyl or $C_3$-$C_{20}$-cycloalkyl which may bear one or more $C_1$-$C_{10}$-alkyl radicals as substituents, $C_6$-$C_{20}$-aryl, $C_7$-$C_{40}$-alkylaryl or $C_7$-$C_{40}$-arylalkyl and may contain one or more heteroatoms from groups 13-17 of the Periodic Table of the Elements or one or more unsaturated bonds;

T and T' are divalent groups of the formulae (II), (III), (IV), (V), (VI), (VIII),

(II)

-continued

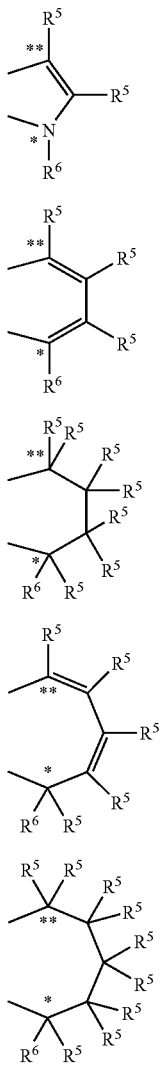

where
the atoms denoted by the symbols * and ** are in each case joined to the atoms of the compound of the formula (I) which are denoted by the same symbol; and
$R^5$ and $R^6$ are identical or different and are each, independently of one another, hydrogen or halogen or linear or branched $C_1$-$C_{20}$-alkyl or $C_3$-$C_{20}$-cycloalkyl which may bear one or more $C_1$-$C_{10}$alkyl radicals as substituents, $C_6$-$C_{40}$aryl, C,-$C_{40}$-alkylaryl or $C_7$-$C_{40}$-arylalkyl And may contain one or more heteroatoms from groups 13-17 of the Periodic Table of the Elements or one or more unsaturated bonds or two radicals $R^5$ or $R^5$ and $R^6$ are joined to one another to form a saturated or unsaturated $C_3$-$C_{20}$ ring;
with at least one organometallic compound of formula (VIII)

$$M^1(R^7)_r(R^8)_s(R^9)_t \quad \text{(VIII)}$$

where
$M^1$ is an alkali metal, an alkaline earth metal or a metal of group 13 of the Periodic Table;
$R^7$ is hydrogen, $C_1$-$C_{10}$-alkyl, $C_3$-$C_{10}$-cycloalkyl, $C_6$-$C_{15}$-aryl, alkylaryl or arylalkyl each having from 1 to 10 carbon atoms in the alkyl part and from 6 to 20 carbon atoms in the aryl part;
$R^8$ and $R_9$ are each hydrogen, halogen, $C_1$-$C_{10}$-alkyl, $C_3$-$C_{10}$-cycloalkyl, $C_6$-$C_{15}$-aryl, alkylaryl, arylalkyl or alkoxy each having from 1 to 10 carbon atoms in the alkyl part and from 6 to 20 carbon atoms in the aryl part;
r is an integer from 1 to 3;
and
s and t are integers from 0 to 2, where the sum r+s+t corresponds to the valence of $M^3$; wherein the organometallic compounds of formula (VIII) comprise at least one branched alkyl radical comprising up to 10 carbon atoms, or a cycloalkyl radical comprising from 3 to 10 carbon atoms;
to form a reaction product which is added to the modified support, wherein the finely divided support and aluminoxane are combined in suspension, and the reaction product and the modified support are contacted in suspension with the suspension medium being removed by evaporation after the reaction product is contacted with the modified support, and wherein the atomic ratio of aluminum from the aluminoxanes to M from the metallocene compounds of formula (I) ranges from 20:1 to 500:1.

21. The process according to claim 20, wherein the atomic ratio of aluminum from the aluminoxanes to M from the metallocene compounds of formula (I) ranges from 30:1 to 400:1.

22. The process for preparing a catalyst solid for olefin polymerization as claimed in claim 20, wherein the finely divided support comprises functional groups, and the finely divided support and an amount of the aluminoxane are selected so that essentially the total amount of the aluminoxane used has reacted with the functional groups of the finely divided support.

23. The process for preparing a catalyst solid for olefin polymerization as claimed in claim 20, wherein the organometallic compound of formula (VIII) is triisobutylaluminum, diisobutylaluminum hydride or a mixture of the two compounds.

24. A catalyst solid obtained by the process as claimed in claim 20.

25. A catalyst system for polymerizing olefins, comprising said catalyst solid as claimed in claim 24.

26. A process for polymerizing olefins which comprises using the catalyst system as claimed in claim 25.

27. A process for preparing a catalyst solid for olefin polymerization as claimed in claim 22, wherein the organometallic compound of formula (VIII) which is used is triisobutylaluminum, diisobutylaluminum hydride or a mixture of the two compounds.

28. A catalyst solid obtained by the process as claimed in claim 27.

29. A process for polymerizing olefins which comprises using the catalyst system as claimed in claim 28.

* * * * *